United States Patent [19]

Fujioka

[11] Patent Number: 4,634,235

[45] Date of Patent: Jan. 6, 1987

[54] LENS SYSTEM CAPABLE OF CONVERTING FOCAL LENGTH BY ADDITION OF A LENS

[75] Inventor: Yoshisato Fujioka, Higashikurume, Japan

[73] Assignee: Ricoh Company, Ltd., Tokyo, Japan

[21] Appl. No.: 522,218

[22] Filed: Aug. 11, 1983

[30] Foreign Application Priority Data

Aug. 11, 1982 [JP] Japan ................................ 57-138454

[51] Int. Cl.⁴ .............................................. G02B 15/02
[52] U.S. Cl. ...................................... 350/422; 350/520
[58] Field of Search ............................... 350/422, 520

[56] References Cited

U.S. PATENT DOCUMENTS

| 3,817,599 | 6/1974 | McCrobie | 350/422 |
| 4,394,071 | 7/1983 | Yamada | 350/422 |
| 4,422,734 | 12/1983 | Tanaka et al. | 350/422 |

FOREIGN PATENT DOCUMENTS 6309   1/1980   Japan ................................ 350/422

Primary Examiner—John K. Corbin
Assistant Examiner—P. M. Dzierzynski
Attorney, Agent, or Firm—Oblon, Fisher, Spivak, McClelland & Maier

[57] ABSTRACT

This invention relates to a lens system which can convert a focal length by adding a converter lens. A rear converter lens having a positive refractive power is added between an image surface rearwardly of a standard or tele-lens system to obtain a wide angle lens. At this time, it is necessary to make the full length of the converter lens small and to prevent an increase in positive Petzval's sum of the converter lens and in negative distortion aberration. In this invention, in case of a wide angle lens, a rear converter lens is used which is composed of three to five lenses having an angle of view, 63.4° and a magnification ratio, more than 1.4.

11 Claims, 28 Drawing Figures

LENS SYSTEM CAPABLE OF CONVERTING FOCAL LENGTH BY ADDITION OF A LENS

BACKGROUND OF THE INVENTION

1. Field of the Invention

This invention relates to a lens system in which a positive auxiliary lens system is detachably mounted between a photographic lens and an image surface to change a focal length of the photographic lens, thus making it possible to take a photograph at a wide angle of view.

2. Description of the Invention

Conventional systems for changing the focal length of the photographic lens include a system using a zoom lens and a system using an auxiliary lens. Separately from the system using the zoom lens which can easily form the lens into a large type, a known magnification system, in the system using the auxiliary lens, for switching a photographic angle of view into a wide angle or a subwide angle and a standard or tele includes:

(1) A tele-type front converter is provided in front (on an object side) of a main lens in a wide angle system, (2) A wide angle type front converter is provided in front of a main lens in a tele-system; and (3) An auxiliary lens having a negative refractive power is mounted between an image surface at rear of a main lens in a wide angle system to increase the resultant focal length.

The aforementioned system (1) has a disadvantage in that the front converter is large. This is particularly conspicuous if the main lens is in wide angle and therefore, aberration is difficult to be well corrected. Where the wide angle is included in a magnification area as in the present invention, this system is extremely difficult to be employed.

The aforementioned system (2) is advantageous, as compared with the system (1), in preventing the front converter from being formed into a large type but has a disadvantage in that since the main lens is in the tele-system, the lens system is long, and if the front coverter is mounted thereon, the lens system is lengthened.

The aforementioned system (3) uses a lens of a wide angle of view as a main lens, and Petzval's sum thereof is naturally designed to make it small. If a negative auxiliary lens is mounted to form a long focal point lens, the negative Petzval's sum increases to make it difficult to obtain a good image surface and in addition, positive distortion aberration also increases.

In addition to the aforementioned systems, the fourth system is considered in which an auxiliary lens having a positive refractive power is mounted at rear of a standard or narrow angle main lens to shorten the resultant focal length. However, this system is hardly known for the reasons below:

a. Since the auxiliary lens having a positive refractive power is added at rear of the main lens, the positive Petzal's sum increases, and the flatness of an image required by the wide angle lens is deteriorated.

b. In the wide angle lens obtained by adding the auxiliary lens having a positive refractive power at rear of the main lens, the positive refractive power is applied to the rear portion of the lens system and therefore, the negative distortion aberration increases. These drawbacks likely occur in the fourth system, rendering design difficult.

For example, in the lens system disclosed in Japanese Patent Application Laid-Open No. 111,825/81 which employs the aforementioned system, the distance from the main lens to the image surface is constant in case where only the main lens is used and in case where the auxiliary lens system is mounted. However, a main point of the auxiliary lens system has to be arranged backwardly due to said restriction, and this deteriorates the magnification efficiency and the full length of the auxiliary lens system is longer than the full length of the main lens, making the system large. As the result, the maximum angle of view is just 55° and the magnification ratio is less than 1.4. Despite this, deterioration of the image-surface characteristic due to the increase in Petzval's sum and an increase in negative distortion aberration are conspicuous.

SUMMARY OF THE INVENTION

In accordance with the present invention, when an auxiliary lens system is mounted, a main lens is slightly moved towards an image and the full length of the auxiliary lens system is reduced to decrease an amount of occurrence of aberration, whereby the aberration can be well corrected while making an angle of view into a wide angle of 60° to 70°.

In a focal length coverter lens system in which a positive auxiliary lens system is mounted at rear of a main lens to provide a wide angle of view, as in the present invention, it is desired that the main lens suitable for a wide angle of view is used. To this end, it is necessary to have a structure which includes at least two positive lenses and at least one negative lens. As one example, there is a triplet as shown in FIG. 1(A). However, it is of course possible that a lens system suitable for a wider angle of view can be used.

It is necessary for the auxiliary lens system to (1) be small in size, in addition to (2) prevent an increase in positive Petzval's sum, and (3) prevent an increase in negative distortion aberration, as described above, in order not only to incorporate it into a camera but to enhance the performance of image formation at a wide angle. When a wide angle is obtained by a combination of a main lens and an auxiliary lens added to a portion at rear of the main lens, an angle incident on the auxiliary lens naturally increases. Thus, the auxiliary lens system likely becomes large, and an amount of aberration occuring in a peripheral portion thereof also increases as the system increases in size. Therefore, if the full length of the auxiliary lens system is reduced, the height of light, from an optical axis, which passes through the auxiliary lens system, also reduces not only to miniaturize the lens system but to minimize the amount of occurrence of aberration. Because of this, in the present invention, the full length $L_A$ of the auxiliary lens system is made less than at least the full length $L_M$ of the main lens system.

$$L_A < L_M$$

Also, it is desired to reduce the number of lenses in order to miniaturize the auxiliary lens system. In the present invention, the positive auxiliary lens system is composed of at least two positive lenses and at least one negative lens. However, in the auxiliary lens system which is composed of just three lenses where an angle of view at a wide angle is 63.4° and a magnification ratio is 1.43 as can be seen from a seventh embodiment which will be described hereinafter, and which is composed of five lenses where an angle of view at a wide angle is 63.4°, a magnification ratio is 2, and brightness is F:2.8 as in a six embodiment, good aberration is obtained. Furthermore, in the auxiliary lens system which is composed of four lenses where a magnification ratio is 1.56 as in first to fourth embodiments, aberration can be well corrected up to an angle of view of 70°.

To make the magnification ratio great and obtain a good aberration condition, it is advantageous to employ a lens arrangement, which is great in magnification effect, even if the refractive power of the auxiliary lens system is small, in preventing an increase in Petzval's sum. It is therefore desired that a first lens on the side of the main lens in the auxiliary lens system is made to comprise a positive lens and a main point on the side of an object in the auxiliary lens system is made to close towards the main lens. Such an optical arrangement brings forth an advantage in that a negative distortion aberration generated when the auxiliary lens system is added decreases.

Moreover, preferably, a first surface of the first lens on the side of the main lens is made to form a convex towards the object. This can prevent an increase in negative distortion aberration and can miniaturize the auxiliary lens system by the converging action thereof. The aforesaid first lens comprises not only a single lens but a cemented lens or a lens including a little air spacing.

Needless to say, it is advantageous, to prevent an increase in Petzval's sum in the auxiliary lens system that the refractive index $n_p$ of a glass material of positive lenses in the auxiliary lens system is made to make it high and that of negative lenses is made to make it low. Preferably, the refractive indexes and Abbe's number taken are in the range as follows:

$n_p > 1.7$ $n_n < 1.7$ $\nu_p > 38$ $\nu_n < 40$

DETAILED DESCRIPTION OF THE PREFERRED EMBODIMENTS

Figure 1A:
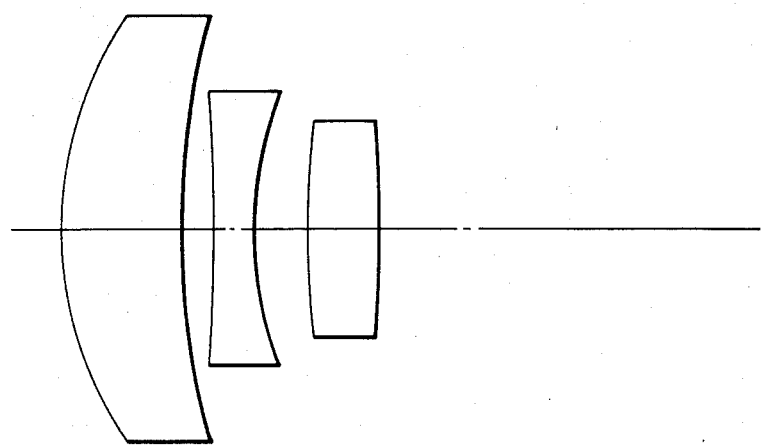
FIGS. 1 and 2, FIGS. 3 and 4, FIGS. 5 and 6, FIGS. 7 and 8, FIGS. 9 and 10, FIGS. 11 and 12, and FIGS. 13 and 14 are sectional views of lenses and aberration views of a first embodiment, a second embodiment, a third embodiment, a fourth embodiment, a fifth embodiment, a sixth embodiment, and a seventh embodiment, respectively, of the lens system in accordance with the present invention, in which drawings, (A) showing the case of only the main lens and (B) showing the case where an auxiliary lens is added.
Figure 1B:
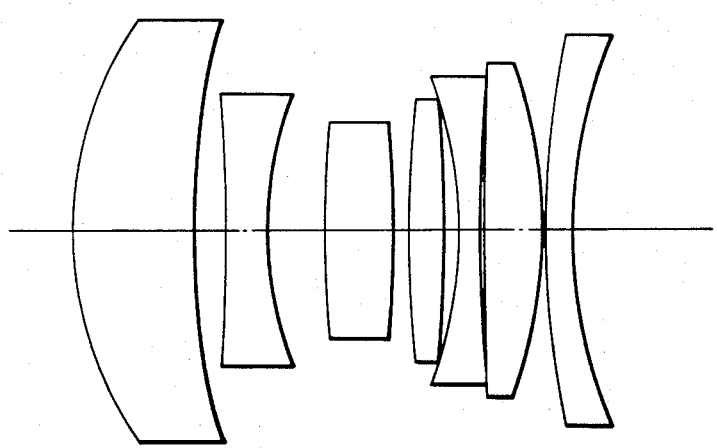
Figure 2A:
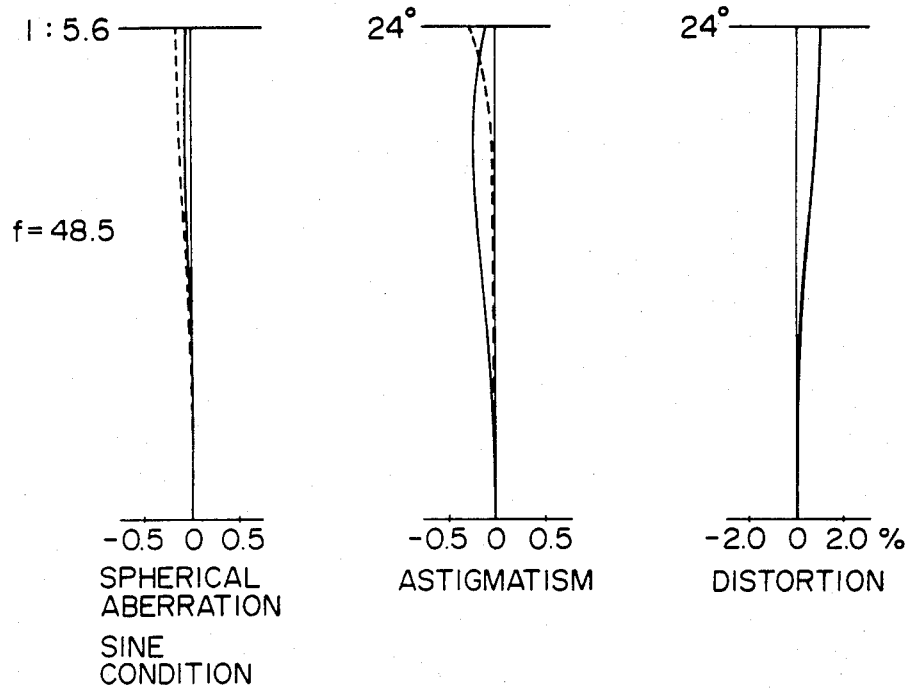
Figure 2B:
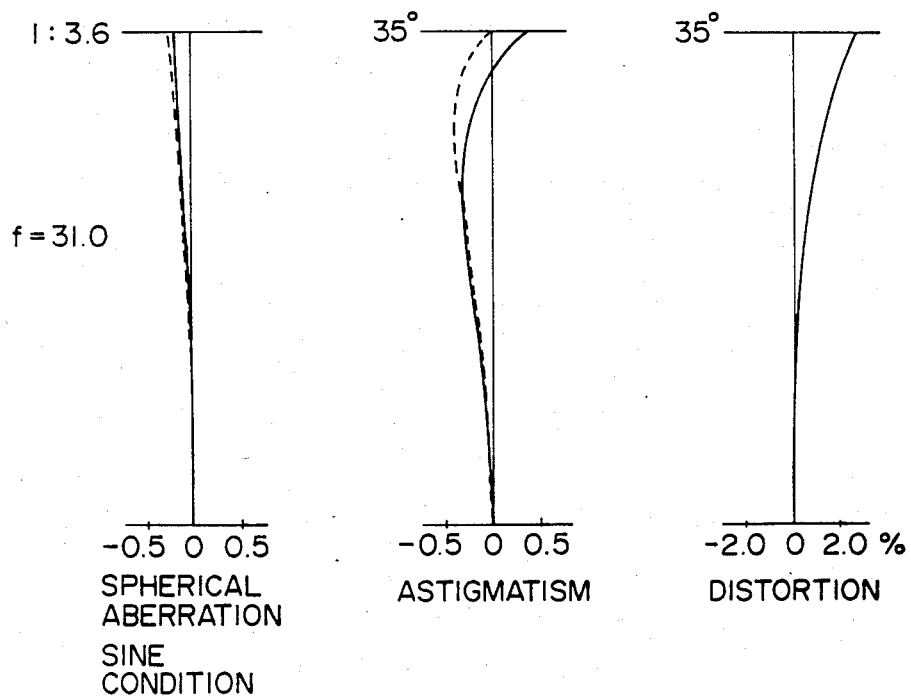
Figure 3A:
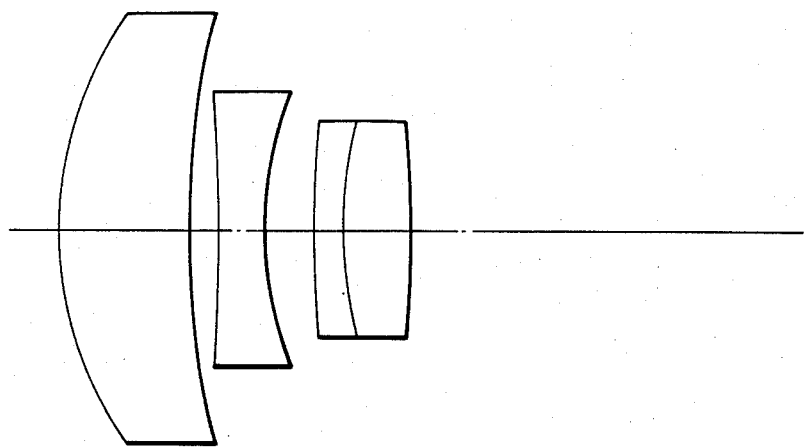
Figure 3B:
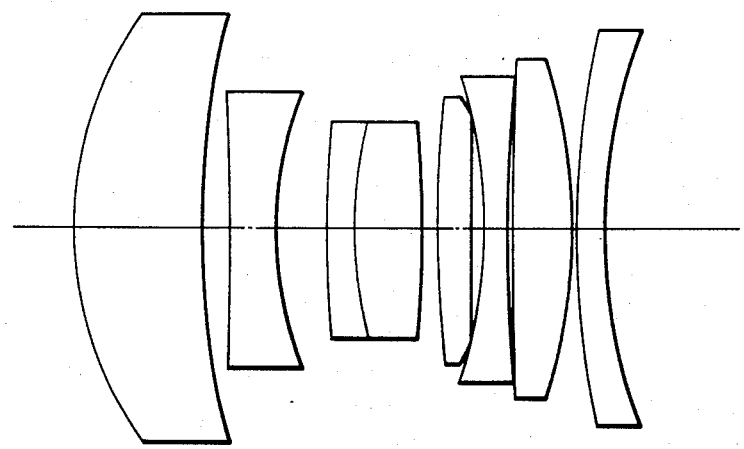
Figure 4A:
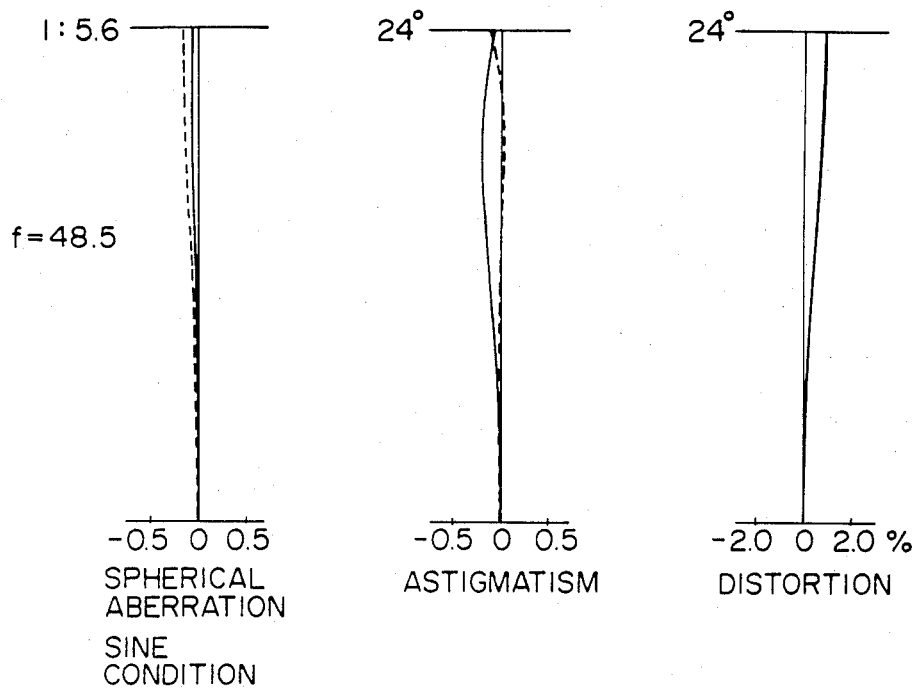
Figure 4B:
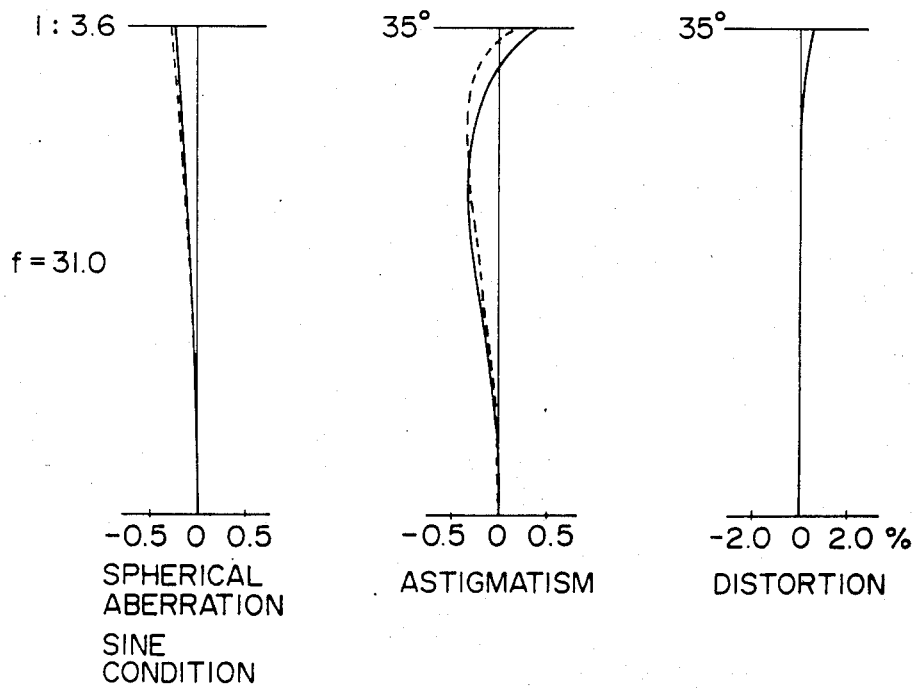
Figure 5A:
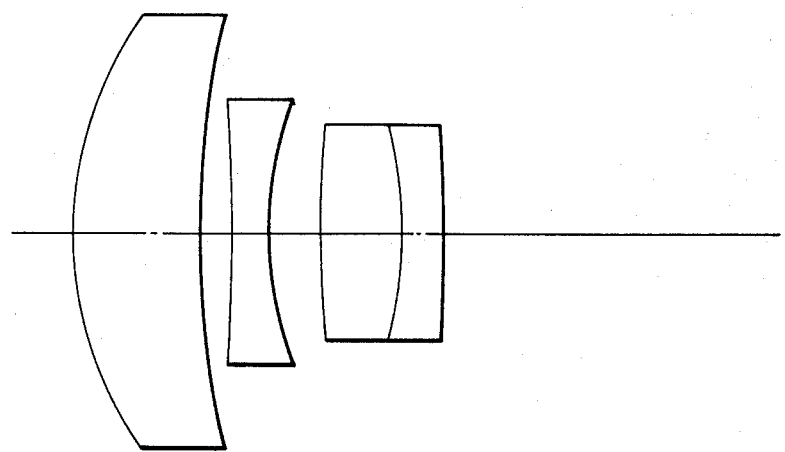
Figure 5B:
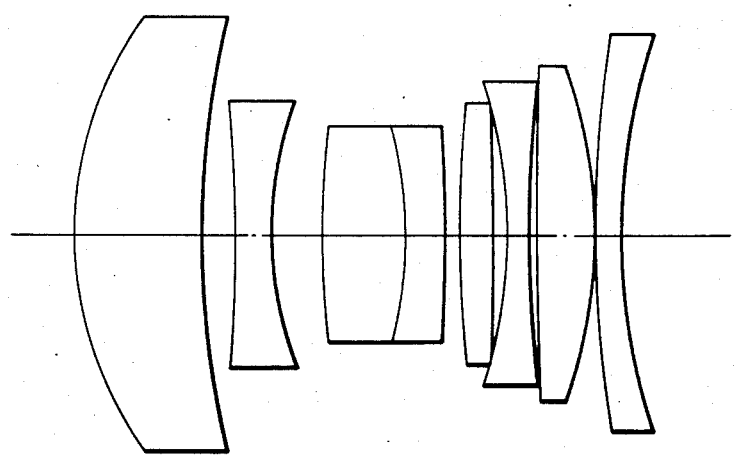
Figure 6A:
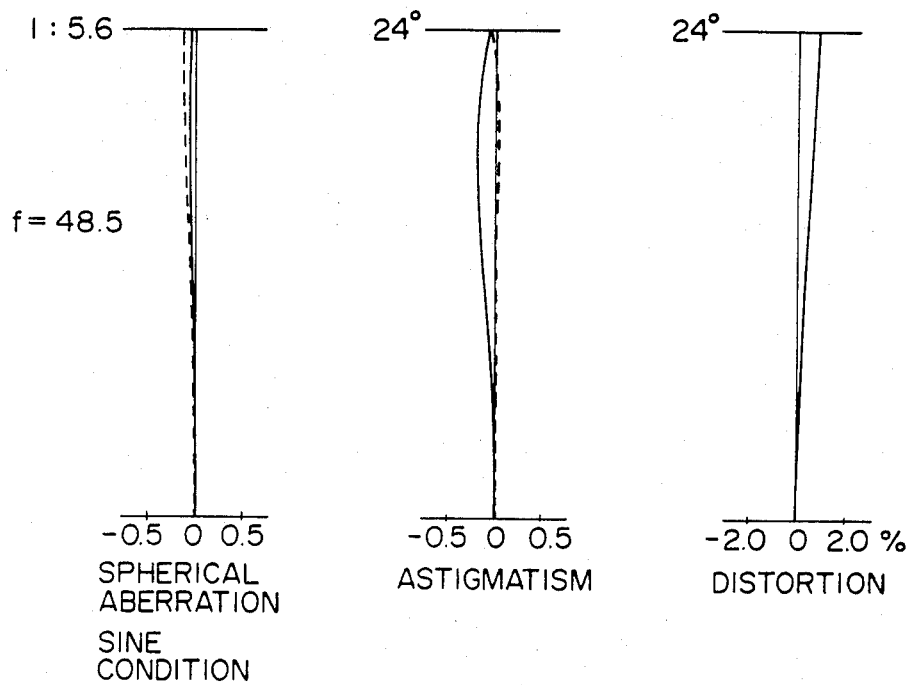
Figure 6B:
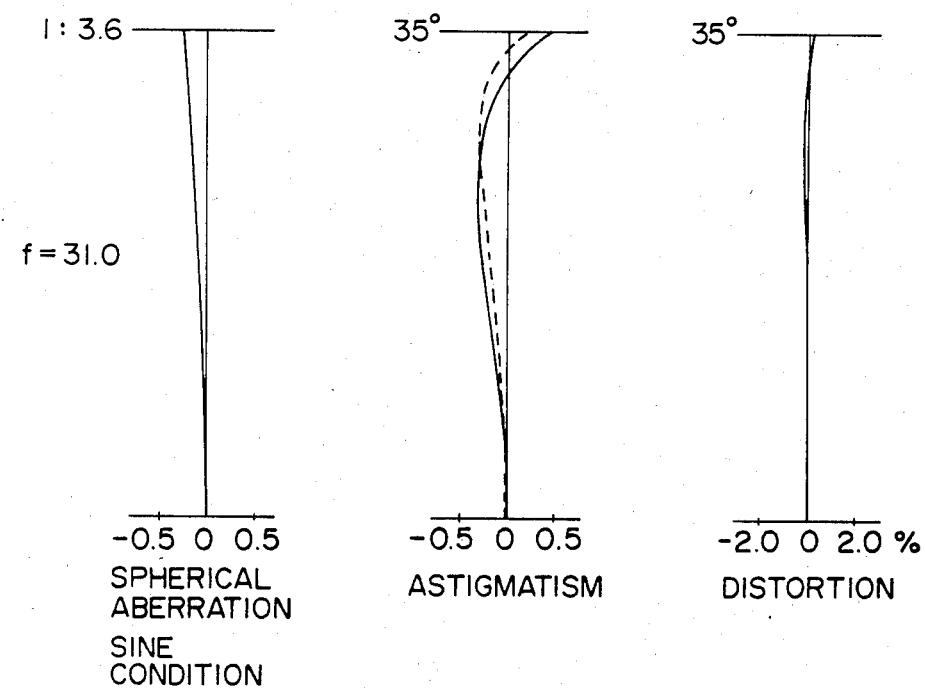
Figure 7A:
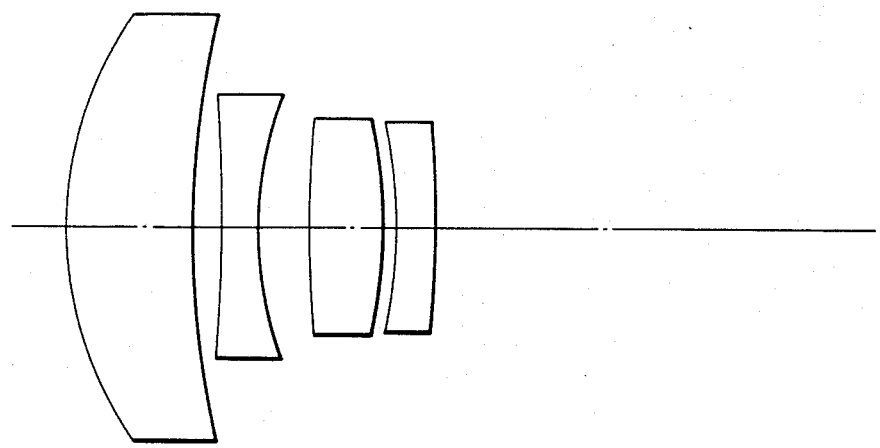
Figure 7B:
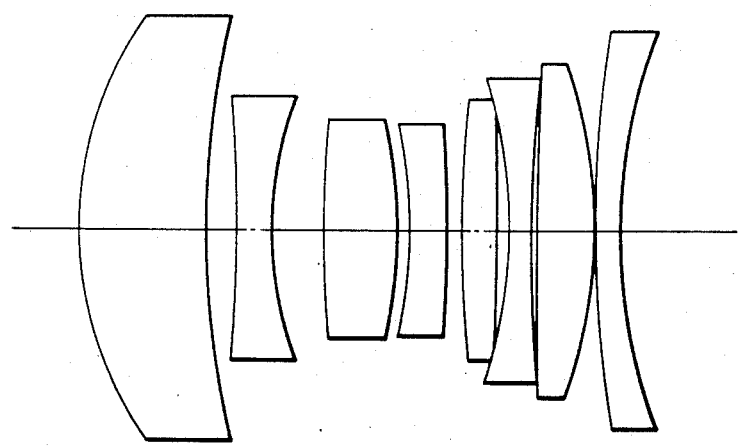
Figure 8A:
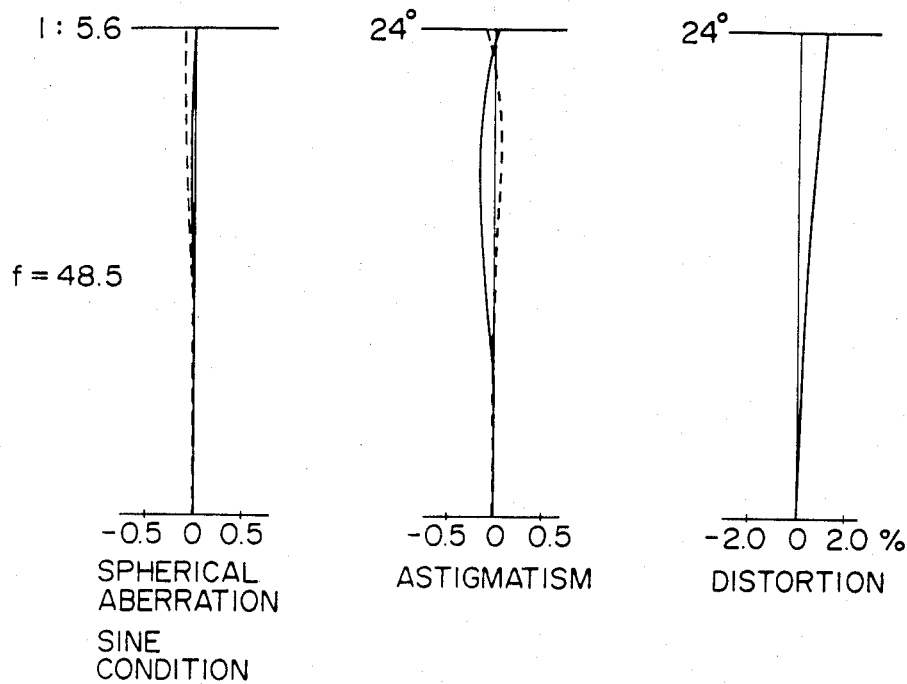
Figure 8B:
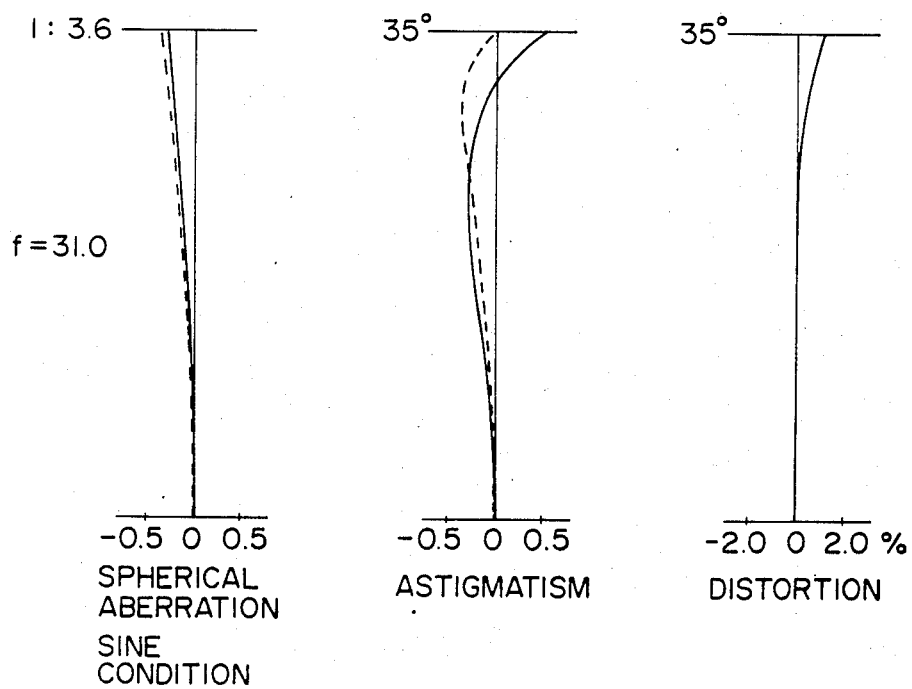
Figure 9A:
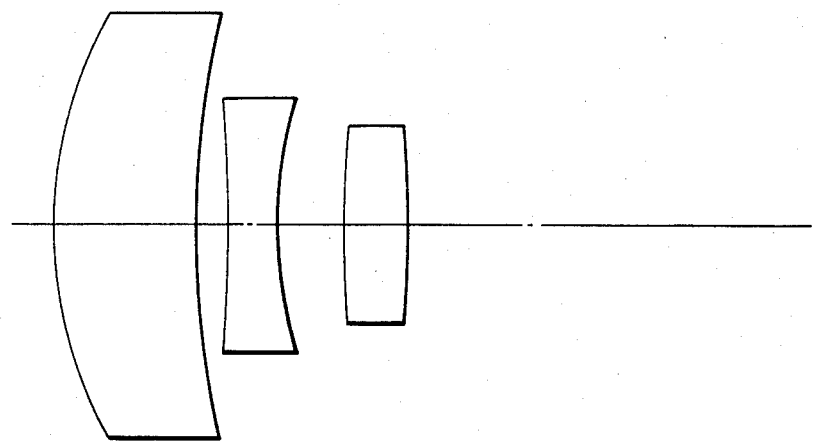
Figure 9B:
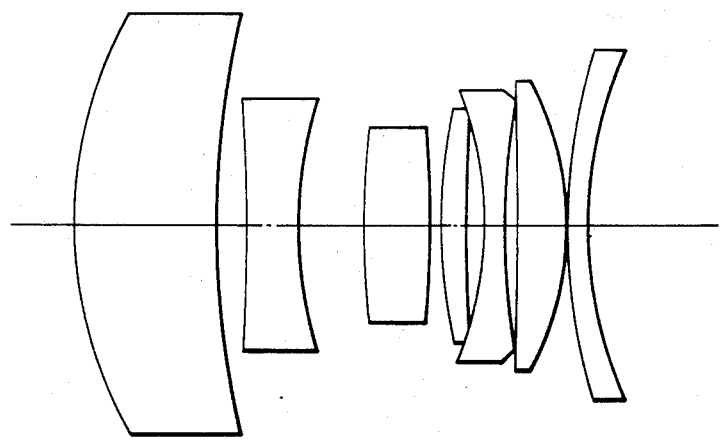
Figure 10A:
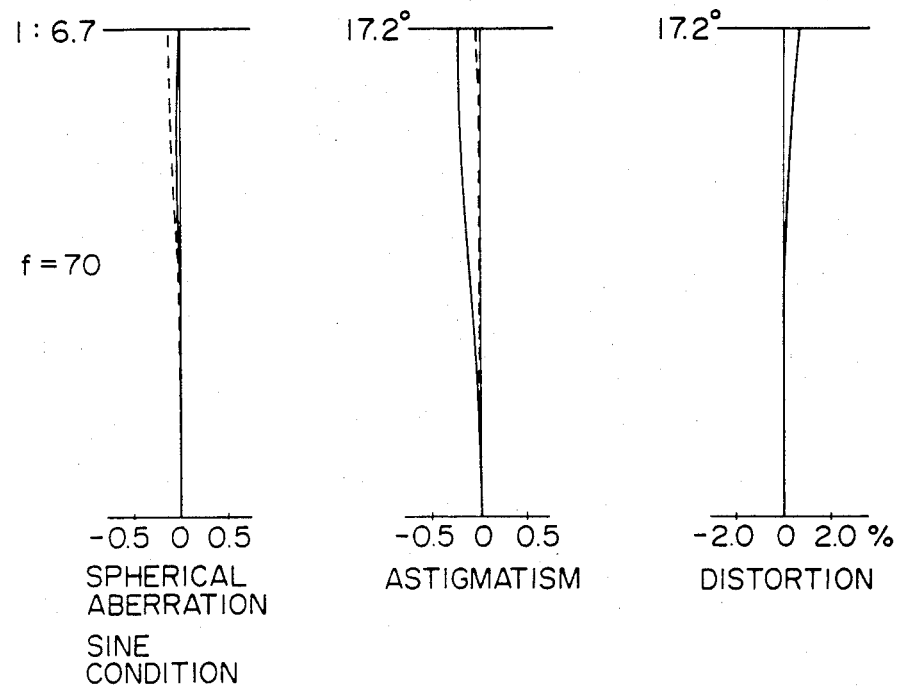
Figure 10B:
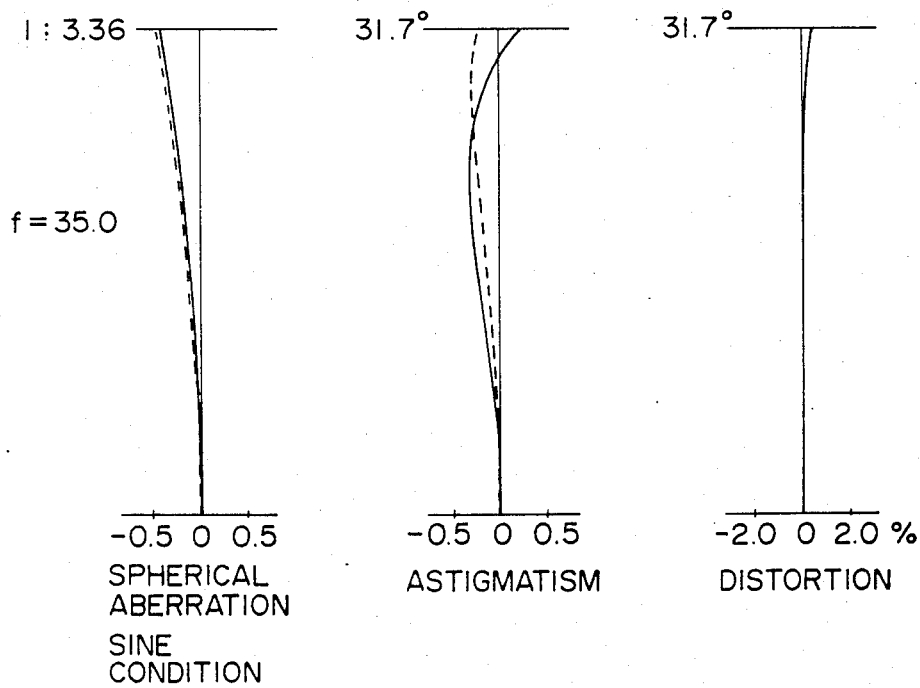
Figure 11A:
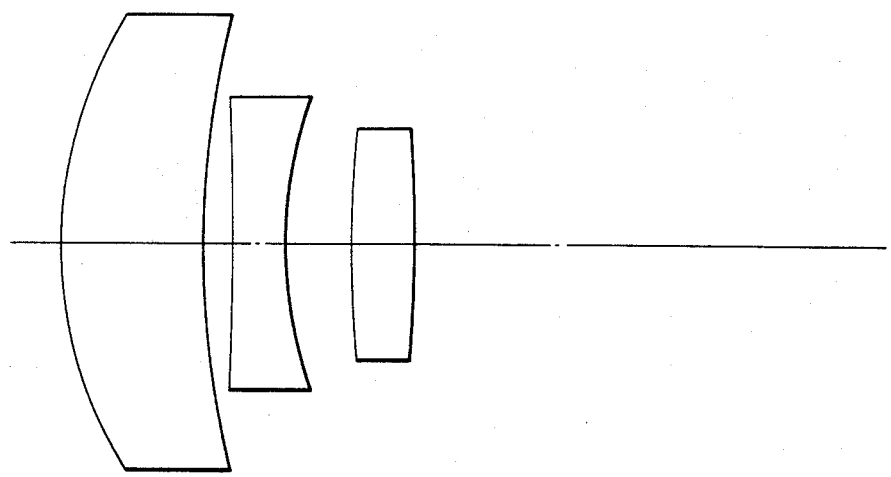
Figure 11B:
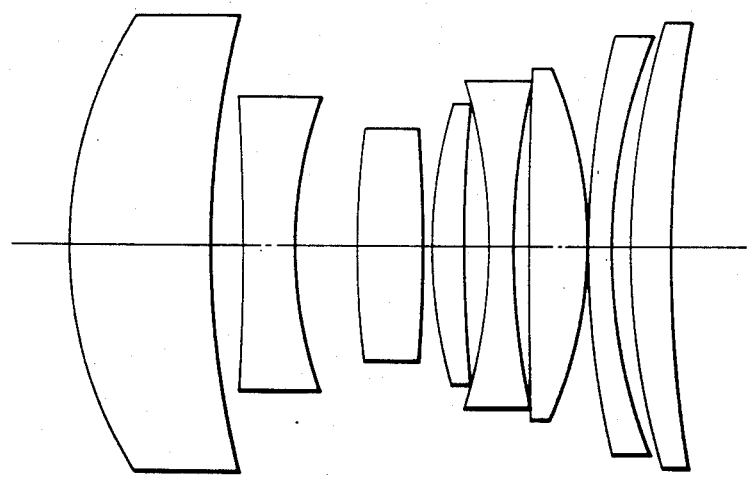
Figure 12A:
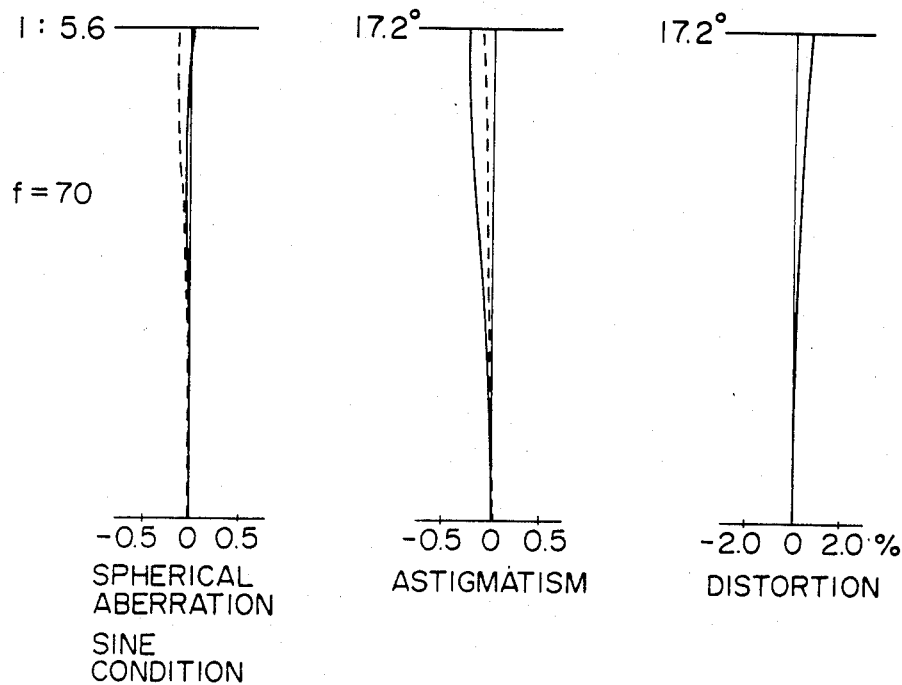
Figure 12B:
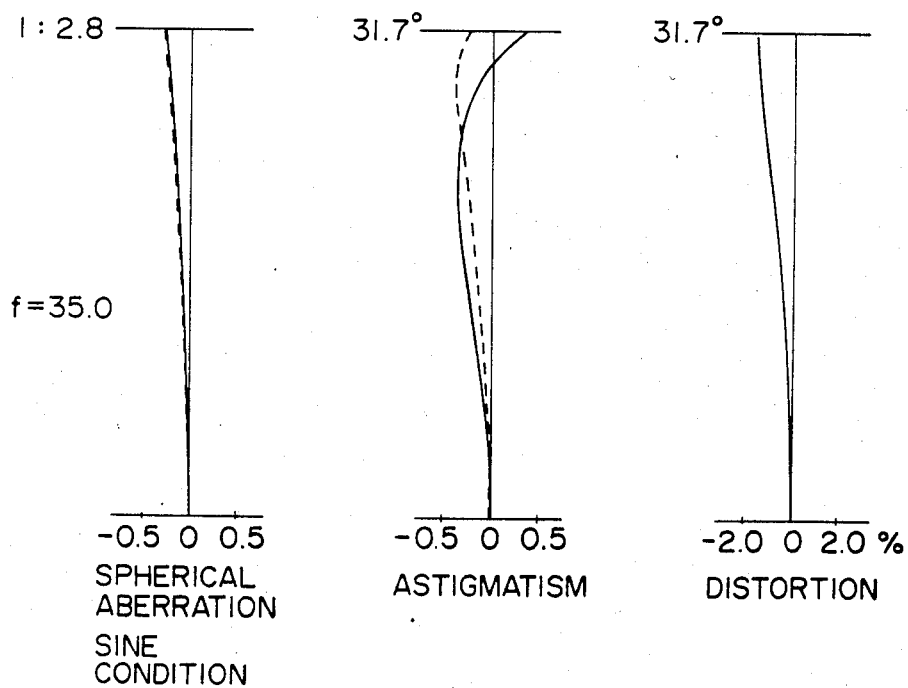
Figure 13A:
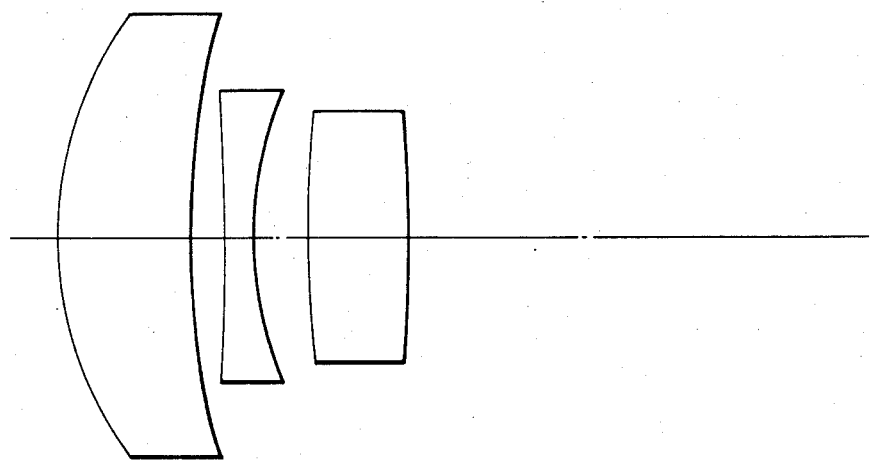
Figure 13B:
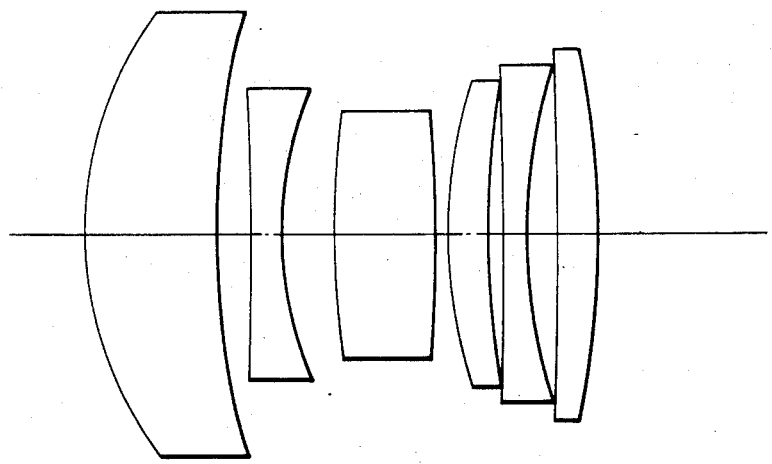
Figure 14A:
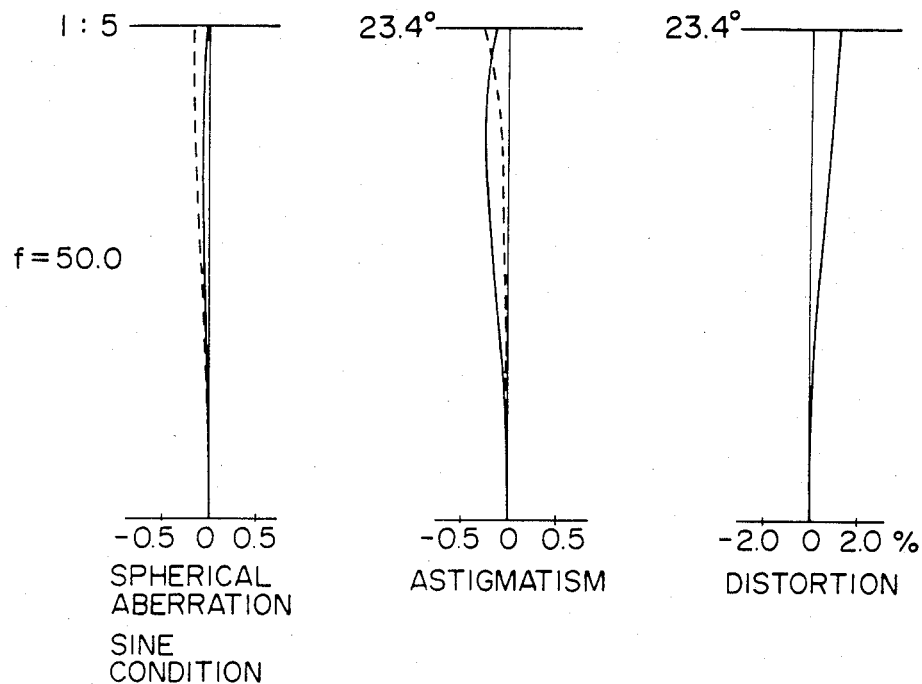
Figure 14B:
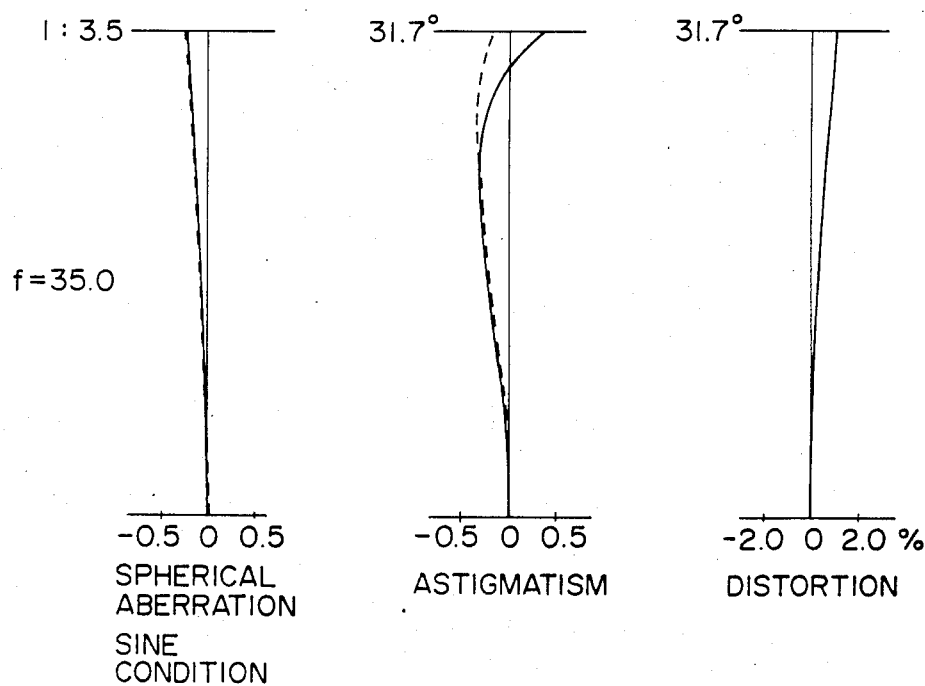

Embodiments of the present invention will now be described.

In each embodiment, (A) shows data for only the main lens and a sectional view and an aberration view thereof, and (B) shows data where the auxiliary lens is added and a sectional view and an aberration view thereof.

In the embodiments 1 to 4, when only the main lens is provided, the focal length is 48.5, the aperture ratio is 1:5.6, and the angle of view is 48°. When the auxiliary lens is added rearwardly of the main lens, the focal length in the resultant system is 31, the aperature ratio is 1:3.6, the angle of view is 70°, and the magnification ratio is 1.56. The embodiment 5 shows a long focal lens in which in only the main lens, the focal length is 70, the aperature ratio is 1:6.7, and the angle of view if 34.4°, and when the auxiliary lens is added rearwardly of the main lens, the length in the resultant lens is 35, the aperature ratio is 1:3.36, the angle of view is 63.4° which is a wide angle, and the magnification ratio is 2. The embodiment 6 shows a long focal lens in which in only the main lens, the focal length is 70, the aperture ratio is 1:5.6, and the angle of view is 34.4°, and in the resultant system in which the auxiliary lens is added, it comprises a bright wide angle lens in which the focal length is 35, the aperture ratio is 1:2.8, the angle of view is 63.4°, and the magnification ratio is 2. In the embodiment 7, in only the main lens, the focal length is 50, the aperture ratio is 1:5, and the angle of view is 46.8°, and in the resultant system in which the auxiliary lens system is added, the focal length is 35, the aperture ratio is 1:3.5, the angle of view is 63.4° which is a wide angle, and the magnification ratio is 1.43.

Reference characters in data:
ri: radius of curvature of refractive surface
di: spacing on axis of refractive surface
ni: refractive index of glass material of each lens with respect to line d
$\nu$i: Abbe's number of glass material of each lens
f: resultant focal length of the whole
bf: backfocus
F: aperture ratio
M: magnification ratio

| Embodiment 1 | | | |
|---|---|---|---|
| (A) Main lens | | | |
| r1 = 13.076 | | | |
| | d1 = 4.70 | n1 = 1.77250 | $\nu$1 = 49.62 |
| r2 = 30.453 | | | |
| | d2 = 1.04 | | |
| r3 = −100.559 | | | |
| | d3 = 1.60 | n2 = 1.72825 | $\nu$2 = 28.32 |
| r4 = 12.817 | | | |
| | d4 = 2.07 | | |
| r5 = 34.892 | | | |
| | d5 = 2.60 | n3 = 1.83400 | $\nu$3 = 37.34 |
| r6 = −48.240 | | | |
| f = 48.5  bf = 38.3 | | | |
| F: 5.6  Angle of view 48° | | | |

| (B) Combination of a main lens and an auxiliary lens system | | | |
|---|---|---|---|
| r1 = 13.076 | | | |
| | d1 = 4.70 | n1 = 1.77250 | $\nu$1 = 49.62 |
| r2 = 30.453 | | | |
| | d2 = 1.04 | | |
| r3 = 100.559 | | | |
| | d3 = 1.60 | n2 = 1.72825 | $\nu$2 = 28.32 |
| r4 = 12.817 | | | |
| | d4 = 2.07 | | |
| r5 = 34.892 | | | |
| | d5 = 2.60 | n3 = 1.83400 | $\nu$3 = 37.34 |
| r6 = 48.240 | | | |
| | d6 = 0.50 | | |
| r7 = 43.695 | | | |
| | d7 = 1.30 | n4 = 1.80610 | $\nu$4 = 40.74 |
| r8 = 67.114 | | | |
| | d8 = 0.586 | | |
| r9 = 14.836 | | | |
| | d9 = 0.90 | n5 = 1.59340 | $\nu$5 = 34.82 |
| r10 = 87.979 | | | |
| | d10 = 0.124 | | |
| r11 = 12.400 | | | |
| | d11 = 2.22 | n6 = 1.77250 | $\nu$6 = 49.62 |
| r12 = 17.244 | | | |
| | d12 = 0.10 | | |

-continued

Embodiment 1 r13 = 40.175
 d13 = 1.00    n7 = 1.59340   ν7 = 34.82
r14 = 18.415
    f = 31     bf = 20.6
    F: 3.6    Angle of view 70°
              M = 1.56

Embodiment 2

(A) Main lens r1 = 13.149
 d1 = 4.92    n1 = 1.74400   ν1 = 44.87
r2 = 34.075
 d2 = 0.94
r3 = −100.091
 d3 = 1.72    n2 = 1.76180   ν2 = 26.91
r4 = 12.930
 d4 = 1.87
r5 = 41.372
 d5 = 1.06    n3 = 1.72342   ν3 = 37.99
r6 = 15.567
 d6 = 2.55    n4 = 1.83400   ν4 = 37.34
r7 = −45.613
    f = 48.5   bf = 38.3
    F: 5.6    Angle of view 48°

(B) Combination of a main lens and an auxiliary lens system r1 = 13.149
 d1 = 4.92    n1 = 1.74400   ν1 = 44.87
r2 = 34.075
 d2 = 0.94
r3 = −100.091
 d3 = 1.72    n2 = 1.76180   ν2 = 26.91
r4 = 12.930
 d4 = 1.87
r5 = 41.372
 d5 = 1.06    n3 = 1.72342   ν3 = 37.99
r6 = 15.567
 d6 = 2.55    n4 = 1.83400   ν4 = 37.34
r7 = −45.613
 d7 = 0.50
r8 = 42.187
 d8 = 1.30    n5 = 1.80610   ν5 = 40.74
r9 = −92.387
 d9 = 0.50
r10 = −16.890
 d10 = 0.90   n6 = 1.59340   ν6 = 34.82
r11 = 74.883
 d11 = 0.20
r12 = 287.146
 d12 = 2.20   n7 = 1.77250   ν7 = 49.62
r13 = −18.930
 d13 = 0.10
r14 = 36.007
 d14 = 1.00   n8 = 1.59340   ν8 = 34.82
r15 = 19.204
    f = 31     bf = 20.7
    F: 3.6    Angle of view 70°
              M = 1.56

Embodiment 3

(A) Main lens r1 = 13.233
 d1 = 4.84    n1 = 1.74400   ν1 = 44.87
r2 = 35.154
 d2 = 1.10
r3 = −92.231
 d3 = 1.42    n2 = 1.76180   ν2 = 26.91
r4 = 12.860
 d4 = 1.87
r5 = 32.293
 d5 = 3.07    n3 = 1.83400   ν3 = 37.34
r6 = −14.405
 d6 = 1.49    n4 = 1.72342   ν4 = 37.99 r7 = −70.229
    f = 48.5   bf = 37.9
    F: 5.6    Angle of view 48°

(B) Combination of a main lens and an auxiliary lens system r1 = 13.233
 d1 = 4.84    n1 = 1.74400   ν1 = 44.87
r2 = 35.154
 d2 = 1.10
r3 = −92.231
 d3 = 1.42    n2 = 1.76180   ν2 = 26.91
r4 = 12.860
 d4 = 1.87
r5 = 32.293
 d5 = 3.07    n3 = 1.83400   ν3 = 37.34
r6 = −14.405
 d6 = 1.49    n4 = 1.72342   ν4 = 37.99
r7 = −70.229
 d7 = 0.50
r8 = 42.287
 d8 = 1.30    n5 = 1.80610   ν5 = 40.74
r9 = −76.972
 d9 = 0.50
r10 = −17.164
 d10 = 0.90   n6 = 1.59340   ν6 = 34.82
r11 = 62.261
 d11 = 0.30
r12 = 3999.342
 d12 = 2.00   n7 = 1.77250   ν7 = 49.62
r13 = −18.493
 d13 = 0.10
r14 = 40.652
 d14 = 1.00   n8 = 1.59340   ν8 = 34.82
r15 = 21.310
    f = 31     bf = 20.5
    F: 3.6    Angle of view 70°
              M = 1.56

Embodiment 4

(A) Main lens r1 = 12.896
 d1 = 4.87    n1 = 1.74400   ν1 = 44.87
r2 = 33.580
 d2 = 1.05
r3 = −71.215
 d3 = 1.35    n2 = 1.76180   ν2 = 26.91
r4 = 13.303
 d4 = 1.87
r5 = 34.441
 d5 = 2.80    n3 = 1.83400   ν3 = 37.34
r6 = −18.337
 d6 = 0.46
r7 = −17.438
 d7 = 1.44    n4 = 1.72342   ν4 = 37.99
r8 = −50.004
    f = 48.5   bf = 37.1
    F: 5.6    Angle of view 48°

(B) Combination of a main lens and an auxiliary lens system r1 = 12.896
 d1 = 4.87    n1 = 1.74400   ν1 = 44.87
r2 = 33.580
 d1 = 1.05
r3 = −71.215
 d3 = 1.35    n2 = 1.76180   ν2 = 26.91
r4 = 13.303
 d4 = 1.87
r5 = 34.441
 d5 = 2.80    n3 = 1.83400   ν3 = 37.34
r6 = −18.337
 d6 = 0.46
r7 = −17.438
 d7 = 1.44    n4 = 1.72342   ν4 = 37.99
r8 = −50.004
 d8 = 0.50
r9 = 45.196
 d9 = 1.30    n5 = 1.80610   ν5 = 40.74

-continued

Embodiment 4 r10 = −76.788
  d10 = 0.52
r11 = −16.923
  d11 = 0.90  n6 = 1.59340  ν6 = 34.82
r12 = 84.374
  d12 = 0.24
r13 = −2804.470
  d13 = 2.00  n7 = 1.77250  ν7 = 49.62
r14 = −18.142
  d14 = 0.10
r15 = 39.302
  d15 = 1.00  n8 = 1.59340  ν8 = 34.82
r16 = 20.357
  f = 31  bf = 20
  F: 3.6  Angle of view 70°
  M = 1.56

Embodiment 5

(A) Main lens r1 = 1.8699
  d1 = 7.00  n1 = 1.77250  ν1 = 49.62
r2 = 42.908
  d2 = 1.40
r3 = −144.309
  d3 = 2.49  n2 = 1.72825  ν2 = 28.32
r4 = 18.009
  d4 = 3.14
r5 = 47.519
  d5 = 3.09  n3 = 1.83400  ν3 = 37.34
r6 = −71.590
  f = 70  bf = 55.1
  F: 6.7  Angle of view 34.4°

(B) Combination of a main lens and an auxiliary lens system r1 = 18.699
  d1 = 7.00  n1 = 1.77250  1 = 49.62
r2 = 42.908
  d2 = 1.40
r3 = −144.309
  d3 = 2.49  n2 = 1.72825  2 = 28.32
r4 = 18.009
  d4 = 3.14
r5 = 47.519
  d5 = 3.09  n3 = 1.83400  3 = 37.34
r6 = −71.590
  d6 = 0.50
r7 = 23.917
  d7 = 1.30  n4 = 1.80420  4 = 46.50
r8 = 173.586
  d8 = 0.90
r9 = −16.585
  d9 = 0.90  n5 = 1.59340  5 = 34.82
r10 = 36.208
  d10 = 0.60
r11 = −148.507
  d11 = 2.20  n6 = 1.77250  6 = 49.62
r12 = −15.116
  d12 = 0.10
r13 = 27.044
  d13 = 1.00  n7 = 1.59340  7 = 34.82
r14 = 20.575
  f = 35  bf = 23.9
  F: 3.36  Angle of view 63.4°
  M = 2

Embodiment 6

(A) Main lens r1 = 18.699
  d1 = 7.00  n1 = 1.77250  ν1 = 49.62
r2 = 42.908
  d2 = 1.40
r3 = −144.309
  d3 = 2.49  n2 = 1.72825  ν2 = 28.32

-continued

Embodiment 6 r4 = 18.009
  d4 = 3.14
r5 = 47.519
  d5 = 3.09  n3 = 1.83400  ν3 = 37.34
r6 = −71.590
  f = 70  bf = 55.1
  F: 5.6  Angle of view 34.4°

(B) Combination of a main lens and an auxiliary lens system r1 = 18.699
  d1 = 7.00  n1 = 1.77250  ν1 = 49.62
r2 = 42.908
  d2 = 1.40
r3 = −144.309
  d3 = 2.49  n2 = 1.72825  ν2 = 28.32
r4 = 18.009
  d4 = 3.14
r5 = 47.519
  d5 = 3.09  n3 = 1.83400  ν3 = 37.34
r6 = −71.590
  d6 = 0.50
r7 = 22.968
  d7 = 1.57  n4 = 1.80420  ν4 = 46.50
r8 = 73.435
  d8 = 1.19
r9 = −23.357
  d9 = 1.09  n5 = 1.59340  ν5 = 34.82
r10 = 32.280
  d10 = 0.88
r11 = 879.220
  d11 = 2.66  n6 = 1.77250  ν6 = 49.62
r12 = −20.180
  d12 = 0.10
r13 = 39.623
  d13 = 1.00  n7 = 1.67270  ν7 = 32.17
r14 = 23.481
  d14 = 1.00
r15 = 34.982
  d15 = 2.00  n8 = 1.75500  ν8 = 52.33
r16 = 59.310
  f = 35  bf = 20.8
  F: 2.8  Angle of view 63.4°
  M = 2

Embodiment 7

(A) Main lens r1 = 13.405
  d1 = 5.00  n1 = 1.77250  ν1 = 49.62
r2 = 29.827
  d2 = 1.22
r3 = −106.714
  d3 = 1.14  n2 = 1.72825  ν2 = 28.32
r4 = 13.080
  d4 = 1.93
r5 = 34.652
  d5 = 3.77  n3 = 1.83400  ν3 = 37.34
r6 = −49.003
  f = 50  bf = 39.2
  F: 5  Angle of view 46.8°

(B) Combination of a main lens and an auxiliary lens system r1 = 13.405
  d1 = 5.00  n1 = 1.77250  1 = 49.62
r2 = 29.827
  d2 = 1.22
r3 = −106.714
  d3 = 1.14  n1 = 1.72825  2 = 28.32
r4 = 13.080
  d4 = 1.93
r5 = 34.652
  d5 = 3.77  n3 = 1.83400  3 = 37.34
r6 = −49.003
  d6 = 0.50
r7 = 17.948
  d7 = 1.50  n4 = 1.77250  4 = 49.62
r8 = 35.980
  d8 = 0.50

-continued

Embodiment 7 r9 = −178.014
  d9 = 0.90   n5 = 1.59340   5 = 34.82
r10 = 19.426
  d10 = 1.10
r11 = −438.739
  d11 = 1.50   n6 = 1.75500   6 = 52.33
r12 = −32.278
  f = 35   bf = 23.2
  F: 3.51   Angle of view 63.4°
  M = 1.43

As will be apparent from the sectional viw of the lens and the aberration view, the system is small, the magnification ratio is great, and the curve of image surface and distortion and various aberrations are well corrected.

What is claimed is:

1. A lens system capable of converting a focal length, which comprises a main lens and an auxiliary lens system detachably added rearwardly of the main lens, in which the auxiliary lens system is added whereby the focal length of the resultant system is converted so as to be shorter than the focal length of the main lens, characterized in that the relation of the full length $L_M$ of the main lens with respect to the full length $L_A$ of the auxiliary lens system is represented by $$L_M > L_A,$$

wherein said auxiliary lens system includes at least two positive lenses and at least one negative lens, and wherein a first surface of a first lens of said auxiliary lens system on the side of said main lens is convex toward said main lens, whereby an increase in negative distortion aberration can be prevented and the length of said auxiliary lens system can be reduced.

2. A lens system of claim 1, characterized in that the following relation is established $$n_p > 1.7$$

$$n_n < 1.7$$

$$v_p > 38$$

$$v_n < 40$$

where $n_p$ and $v_p$ are the refractive index and Abbe's number, respectively, of the positive lenses in the auxiliary lens system, and $n_n$ and $v_n$ are the refractive index and Abbe's number, respectively, of the negative lenses.

3. A lens system of claim 1 having the following data:

(A) Main lens r1 = 13.076
  d1 = 4.70   n1 = 1.77250   v1 = 49.62
r2 = 30.453
  d2 = 1.04
r3 = −100.559
  d3 = 1.60   n2 = 1.72825   v2 = 28.32
r4 = 12.817
  d4 = 2.07
r5 = 34.892
  d5 = 2.60   n3 = 1.83400   v3 = 37.34
r6 = −48.240
  f = 48.5   bf = 38.3
  F: 5.6   Angle of view 48°

(B) Combination of a main lens and an auxiliary lens system r1 = 13.076
  d1 = 4.70   n1 = 1.77250   v1 = 49.62
r2 = 30.453
  d2 = 1.04
r3 = −100.559
  d3 = 1.60   n2 = 1.72825   v2 = 28.32
r4 = 12.817
  d4 = 2.07
r5 = 34.892
  d5 = 2.60   n3 = 1.83400   v3 = 37.34
r6 = −48.240
  d6 = 0.50
r7 = 43.695
  d7 = 1.30   n4 = 1.80610   v4 = 40.74
r8 = −67.114
  d8 = 0.586
r9 = −14.836
  d9 = 0.90   n5 = 1.59340   v5 = 34.82
r10 = 87.979
  d10 = 0.124
r11 = 12.400
  d11 = 2.22   n6 = 1.77250   v6 = 49.62
r12 = −17.244
  d12 = 0.10
r13 = 40.175
  d13 = 1.00   n7 = 1.59340   v7 = 34.82
r14 = 18.415
  f = 31   bf = 20.6
  F: 3.6   Angle of view 70°
  M = 1.56

4. A lens system of claim 1 having the following data:

(A) Main lens r1 = 13.149
  d1 = 4.92   n1 = 1.74400   v1 = 44.87
r2 = 34.075
  d2 = 0.94
r3 = −100.091
  d3 = 1.72   n2 = 1.76180   v2 = 26.91
r4 = 12.93
  d4 = 1.87
r5 = 41.372
  d5 = 1.06   n3 = 1.72342   v3 = 37.99
r6 = 15.567
  d6 = 2.55   n4 = 1.83400   v4 = 37.34
r7 = −45.613
  f = 48.5   bf = 38.3
  F: 5.6   Angle of view 48°

(B) Combination of a main lens and an auxiliary lens system r1 = 13.149
  d1 = 4.92   n1 = 1.74400   1 = 44.87
r2 = 34.075
  d2 = 0.94
r3 = −100.091
  d3 = 1.72   n2 = 1.76180   2 = 26.91
r4 = 12.930
  d4 = 1.87
r5 = 41.372
  d5 = 1.06   n3 = 1.72342   3 = 37.99
r6 = 15.567
  d6 = 2.55   n4 = 1.83400   4 = 37.34
r7 = −45.613
  d7 = 0.50
r8 = 42.187
  d8 = 1.30   n5 = 1.80610   5 = 40.74
r9 = −92.387
  d9 = 0.50
r10 = −16.890
  d10 = 0.90   n6 = 1.59340   6 = 34.82
r11 = 4.883
  d11 = 0.20
r12 = 287.146
  d12 = 2.20   n7 = 1.77250   7 = 49.62
r13 = −18.930

-continued

|  |  |  |  |
|---|---|---|---|
| r14 = 36.007 | d13 = 0.10 | | |
| | d14 = 1.00 | n8 = 1.59340 | 8 = 34.82 |
| r15 = 19.204 | | | |
| | f = 31 | bf = 20.7 | |
| | F: 3.6 | Angle of view 70° | |
| | | M = 1.56 | |

5. A lens system of claim 1 having the following data:

| (A) Main lens | | | |
|---|---|---|---|
| r1 = 13.233 | | | |
| | d1 = 4.84 | n1 = 1.74400 | ν1 = 44.87 |
| r2 = 35.154 | | | |
| | d2 = 1.10 | | |
| r3 = −92.231 | | | |
| | d3 = 1.42 | n2 = 1.76180 | ν2 = 26.91 |
| r4 = 12.860 | | | |
| | d4 = 1.87 | | |
| r5 = 32.293 | | | |
| | d5 = 3.07 | n3 = 1.83400 | ν3 = 37.34 |
| r6 = −14.405 | | | |
| | d6 = 1.49 | n4 = 1.72342 | ν4 = 37.99 |
| r7 = −70.229 | | | |
| | f = 48.5 | bf = 37.9 | |
| | F: 5.6 | Angle of view 48° | |

| (B) Combination of a main lens and an auxiliary lens system | | | |
|---|---|---|---|
| r1 = 13.233 | | | |
| | d1 = 4.84 | n1 = 1.74400 | ν1 = 44.87 |
| r2 = 35.154 | | | |
| | d2 = 1.10 | | |
| r3 = −92.231 | | | |
| | d3 = 1.42 | n2 = 1.76180 | ν2 = 26.91 |
| r4 = 12.860 | | | |
| | d4 = 1.87 | | |
| r5 = 32.293 | | | |
| | d5 = 3.07 | n3 = 1.83400 | ν3 = 37.34 |
| r6 = −14.405 | | | |
| | d6 = 1.49 | n4 = 1.72342 | ν4 = 37.99 |
| r7 = −70.229 | | | |
| | d7 = 0.50 | | |
| r8 = 42.287 | | | |
| | d8 = 1.30 | n5 = 1.80610 | ν5 = 40.74 |
| r9 = −76.972 | | | |
| | d9 = 0.50 | | |
| r10 = −17.164 | | | |
| | d10 = 0.90 | n6 = 1.59340 | ν6 = 34.82 |
| r11 = 62.261 | | | |
| | d11 = 0.30 | | |
| r12 = 3999.342 | | | |
| | d12 = 2.00 | n7 = 1.77250 | ν7 = 49.62 |
| r13 = −18.493 | | | |
| | d13 = 0.10 | | |
| r14 = 40.652 | | | |
| | d14 = 1.00 | n8 = 1.59340 | ν8 = 34.82 |
| r15 = 21.310 | | | |
| | f = 31 | bf = 20.5 | |
| | F: 3.6 | Angle of view 70° | |
| | | M = 1.56 | |

6. A lens system of claim 1 having the following data:

| (A) Main lens | | | |
|---|---|---|---|
| r1 = 12.896 | | | |
| | d1 = 4.87 | n1 = 1.74400 | ν1 = 44.87 |
| r2 = 33.580 | | | |
| | d2 = 1.05 | | |
| r3 = −71.215 | | | |
| | d3 = 1.35 | n2 = 1.76180 | ν2 = 26.91 |
| r4 = 13.303 | | | |
| | d4 = 1.87 | | |
| r5 = 34.441 | | | |
| | d5 = 2.80 | n3 = 1.83400 | ν3 = 37.34 |
| r6 = −18.337 | | | |
| | d6 = 0.46 | | |
| r7 = −17.438 | | | |
| | d7 = 1.44 | n4 = 1.72342 | ν4 = 37.99 |
| r8 = −50.004 | | | |
| | f = 48.5 | bf = 37.1 | |
| | F: 5.6 | Angle of view 48° | |

| (B) Combination of a main lens and an auxiliary lens system | | | |
|---|---|---|---|
| r1 = 12.896 | | | |
| | d1 = 4.87 | n1 = 1.74400 | ν1 = 44.87 |
| r2 = 33.580 | | | |
| | d1 = 1.05 | | |
| r3 = −71.215 | | | |
| | d3 = 1.35 | n2 = 1.76180 | ν2 = 26.91 |
| r4 = 13.303 | | | |
| | d4 = 1.87 | | |
| r5 = 34.441 | | | |
| | d5 = 2.80 | n3 = 1.83400 | ν3 = 37.34 |
| r6 = −18.337 | | | |
| | d6 = 0.46 | | |
| r7 = −17.438 | | | |
| | d7 = 1.44 | n4 = 1.72342 | ν4 = 37.99 |
| r8 = −50.004 | | | |
| | d8 = 0.50 | | |
| r9 = 45.196 | | | |
| | d9 = 1.30 | n5 = 1.80610 | ν5 = 40.74 |
| r10 = −76.788 | | | |
| | d10 = 0.52 | | |
| r11 = −16.923 | | | |
| | d11 = 0.90 | n6 = 1.59340 | ν6 = 34.82 |
| r12 = 84.374 | | | |
| | d12 = 0.24 | | |
| r13 = −2804.470 | | | |
| | d13 = 2.00 | n7 = 1.77250 | ν7 = 49.62 |
| r14 = −18.142 | | | |
| | d14 = 0.10 | | |
| r15 = 39.302 | | | |
| | d15 = 1.00 | n8 = 1.59340 | ν8 = 34.82 |
| r16 = 20.357 | | | |
| | f = 31 | bf = 20 | |
| | F: 3.6 | Angle of view 70° | |
| | | M = 1.56 | |

7. A lens system of claim 1 having the following data:

| (A) Main lens | | | |
|---|---|---|---|
| r1 = 18.699 | | | |
| | d1 = 7.00 | n1 = 1.77250 | 1 = 49.62 |
| r2 = 42.908 | | | |
| | d2 = 1.40 | | |
| r3 = −144.309 | | | |
| | d3 = 2.49 | n2 = 1.72825 | 2 = 28.32 |
| r4 = 18.009 | | | |
| | d4 = 3.14 | | |
| r5 = 47.519 | | | |
| | d5 = 3.09 | n3 = 1.83400 | 3 = 37.34 |
| r6 = −71.590 | | | |
| | f = 70 | bf = 55.1 | |
| | F: 6.7 | Angle of view 34.4° | |

| (B) Combination of a main lens and an auxiliary lens system | | | |
|---|---|---|---|
| r1 = 18.699 | | | |
| | d1 = 7.00 | n1 = 1.77250 | ν1 = 49.62 |
| r2 = 42.908 | | | |
| | d2 = 1.40 | | |
| r3 = −144.309 | | | |
| | d3 = 2.49 | n2 = 1.72825 | ν2 = 28.32 |
| r4 = 18.009 | | | |
| | d4 = 3.14 | | |
| r5 = 47.519 | | | |
| | d5 = 3.09 | n3 = 1.83400 | ν3 = 37.34 |
| r6 = −71.590 | | | |
| | d6 = 0.50 | | |
| r7 = 23.917 | | | |
| | d7 = 1.30 | n4 = 1.80420 | ν4 = 46.50 |
| r8 = 173.586 | | | |
| | d8 = 0.90 | | |
| r9 = −16.585 | | | |
| | d9 = 0.90 | n5 = 1.59340 | ν5 = 34.82 |

-continued

```
r10 = 36.208
           d10 = 0.60
r11 = -148.507
           d11 = 2.20    n6 = 1.77250    v6 = 49.62
r12 = -15.116
           d12 = 0.10
r13 = 27.044
           d13 = 1.00    n7 = 1.59340    v7 = 34.82
r14 = 20.575
        f = 35   bf = 23.9
        F: 3.36  Angle of view 63.4°
                 M = 2
```

8. A lens system of claim 1 having the following data:

(A) Main lens

```
r1 = 18.699
          d1 = 7.00   n1 = 1.77250    v1 = 49.62
r2 = 42.908
          d2 = 1.40
r3 = -144.309
          d3 = 2.49   n2 = 1.72825    v2 = 28.32
r4 = 18.009
          d4 = 3.14
r5 = 47.519
          d5 = 3.09   n3 = 1.83400    v3 = 37.34
r6 = -71.590
        f = 70   bf = 55.1
        F: 5.6  Angle of view 34.4°
```

(B) Combination of a main lens and an auxiliary lens system

```
r1 = 18.699
          d1 = 7.00   n1 = 1.77250    v1 = 49.62
r2 = 42.908
          d2 = 1.40
r3 = -144.309
          d3 = 2.49   n2 = 1.72825    v2 = 28.32
r4 = 18.009
          d4 = 3.14
r5 = 47.519
          d5 = 3.09   n3 = 1.83400    v3 = 37.34
r6 = -71.590
          d6 = 0.50
r7 = 22.968
          d7 = 1.57   n4 = 1.80420    v4 = 46.50
r8 = 73.435
          d8 = 1.19
r9 = -23.357
          d9 = 1.09   n5 = 1.59340    v5 = 34.82
r10 = 32.280
          d10 = 0.88
r11 = 879.220
          d11 = 2.66  n6 = 1.77250    v6 = 49.62
r12 = -20.180
          d12 = 0.10
r13 = 39.623
          d13 = 1.00  n7 = 1.67270    v7 = 32.17
```

-continued

```
r14 = 23.481
          d14 = 1.00
r15 = 34.982
          d15 = 2.00  n8 = 1.75500    v8 = 52.33
r16 = 59.310
        f = 35   bf = 20.8
        F: 2.8  Angle of view 63.4°
                M = 2
```

9. A lens system of claim 1 having the following data:

(A) Main lens

```
r1 = 13.405
          d1 = 5.00   n1 = 1.77250    v1 = 49.62
r2 = 29.827
          d2 = 1.22
r3 = -106.714
          d3 = 1.14   n2 = 1.72825    v2 = 28.32
r4 = 13.080
          d4 = 1.93
r5 = 34.652
          d5 = 3.77   n3 = 1.83400    v3 = 37.34
r6 = -49.003
        f = 50   bf = 39.2
        F: 5   Angle of view 46.8°
```

(B) Combination of a main lens and an auxiliary lens system

```
r1 = 13.405
          d1 = 5.00   n1 = 1.77250    v1 = 49.62
r2 = 29.827
          d2 = 1.22
r3 = -106.714
          d3 = 1.14   n1 = 1.72825    v2 = 28.32
r4 = 13.080
          d4 = 1.93
r5 = 34.652
          d5 = 3.77   n3 = 1.83400    v3 = 37.34
r6 = -49.003
          d6 = 0.50
r7 = 17.948
          d7 = 1.50   n4 = 1.77250    v4 = 49.62
r8 = 35.980
          d8 = 0.50
r9 = -178.014
          d9 = 0.90   n5 = 1.59340    v5 = 34.82
r10 = 19.426
          d10 = 1.10
r11 = -438.739
          d11 = 1.50  n6 = 1.75500    v6 = 52.33
r12 = -32.278
        f = 35   bf = 23.2
        F: 3.51  Angle of view 63.4°
                 M = 1.43
```

10. The lens system of claim 1 wherein the focal length of said auxiliary lens system is positive.

11. The lens system of claim 1 wherein said first lens is a positive lens.

* * * * *